(12) United States Patent
Lehmann

(10) Patent No.: US 11,932,041 B2
(45) Date of Patent: Mar. 19, 2024

(54) LASER PRINTING PROCESS

(71) Applicant: Heliosonic GmbH, Wesel (DE)

(72) Inventor: Udo Lehmann, Wesel (DE)

(73) Assignee: Heliosonic GmbH, Wesel (DE)

( * ) Notice: Subject to any disclaimer, the term of this patent is extended or adjusted under 35 U.S.C. 154(b) by 885 days.

(21) Appl. No.: 16/970,477

(22) PCT Filed: Mar. 8, 2019

(86) PCT No.: PCT/EP2019/055884
§ 371 (c)(1),
(2) Date: Aug. 17, 2020

(87) PCT Pub. No.: WO2019/175056
PCT Pub. Date: Sep. 19, 2019

(65) Prior Publication Data
US 2020/0369064 A1    Nov. 26, 2020

(30) Foreign Application Priority Data
Mar. 12, 2018   (DE) .......................... 102018001938.2

(51) Int. Cl.
B41M 5/46      (2006.01)
B41M 5/382     (2006.01)
B41M 5/395     (2006.01)
C09D 11/10     (2014.01)

(52) U.S. Cl.
CPC ........ B41M 5/465 (2013.01); B41M 5/38207 (2013.01); B41M 5/395 (2013.01); C09D 11/10 (2013.01); B41M 2205/08 (2013.01); B41M 2205/30 (2013.01)

(58) Field of Classification Search
CPC .. B41M 5/38207; B41M 5/395; B41M 5/465; B41M 2205/08; B41M 2205/30; C09D 11/037; C09D 11/10
See application file for complete search history.

(56) References Cited

U.S. PATENT DOCUMENTS

| 5,021,808 A | 6/1991 | Kohyama |
| 5,312,683 A | 5/1994 | Chou et al. |
| 5,459,016 A | 10/1995 | Debe et al. |

(Continued)

FOREIGN PATENT DOCUMENTS

| CN | 102576576 | 7/2012 |
| DE | 10210146 A1 | 9/2003 |

(Continued)

OTHER PUBLICATIONS

International Search Report and Written Opinion for International Patent Application No. PCT/EP2019/055884 dated Jun. 13, 2019 (10 pages).

*Primary Examiner* — Gerard Higgins
(74) *Attorney, Agent, or Firm* — Fitch, Even, Tabin & Flannery LLP

(57) ABSTRACT

Printing process in which a substrate to be printed is disposed opposite an ink carrier having an ink layer, the ink layer being irradiated regionally by a laser beam, said layer accelerating by absorption of the laser beam in the substrate direction, wherein for laser absorption the ink layer is admixed with reflective particles and as soluble polymer having a weight average (Mw) molecular weight of greater than 250 000 g/mol.

19 Claims, 1 Drawing Sheet

(56) References Cited

U.S. PATENT DOCUMENTS

| | | |
|---|---|---|
| 5,516,622 A | 5/1996 | Savini et al. |
| 5,518,861 A | 5/1996 | Coveleskie et al. |
| 6,222,567 B1 | 4/2001 | Schuster et al. |
| 6,241,344 B1 | 6/2001 | Machida |
| 8,922,611 B1 | 12/2014 | Benton |
| 2006/0181600 A1 | 8/2006 | Bourdelais |
| 2011/0310205 A1 | 12/2011 | Kleine |
| 2012/0164777 A1 | 6/2012 | Klein Jaeger et al. |
| 2016/0167400 A1 | 6/2016 | Ruiz Vega et al. |
| 2021/0086541 A1* | 3/2021 | Speer .................. B41M 5/0064 |

FOREIGN PATENT DOCUMENTS

| | | | |
|---|---|---|---|
| JP | S60071260 | 4/1985 | |
| JP | S62184859 | 8/1987 | |
| JP | S62218137 | 9/1987 | |
| JP | S6377781 | 4/1988 | |
| JP | S63290789 | 11/1988 | |
| JP | H01108076 | 4/1989 | |
| JP | H1245093 | 9/1989 | |
| JP | H01301268 | 12/1989 | |
| JP | H02591 | 1/1990 | |
| JP | H02225053 | 9/1990 | |
| JP | H02235643 | 9/1990 | |
| JP | H624151 | 2/1994 | |
| JP | H732774 | 2/1995 | |
| JP | H7172074 | 7/1995 | |
| JP | H7195834 | 8/1995 | |
| JP | H8197862 | 8/1996 | |
| JP | H09193391 | 7/1997 | |
| JP | H7290837 | 5/1999 | |
| JP | H11138773 | 5/1999 | |
| JP | 2001158177 | 6/2001 | |
| JP | 2001158182 A | 6/2001 | |
| JP | 2001199170 | 7/2001 | |
| JP | 2001253178 | 9/2001 | |
| JP | 2008055618 | 3/2008 | |
| JP | 2008520452 | 6/2008 | |
| JP | 2010505640 | 2/2010 | |
| JP | 2010083133 | 4/2010 | |
| JP | 2012512067 | 5/2012 | |
| JP | 2012144669 | 8/2012 | |
| JP | 2015091647 | 5/2015 | |
| JP | 2015134500 | 7/2015 | |
| WO | 2008092650 | 8/2008 | |
| WO | 2019154980 | 8/2019 | |
| WO | WO-2019162212 A1 * | 8/2019 | .......... B41M 5/0052 |
| WO | 2021047886 | 3/2021 | |

* cited by examiner

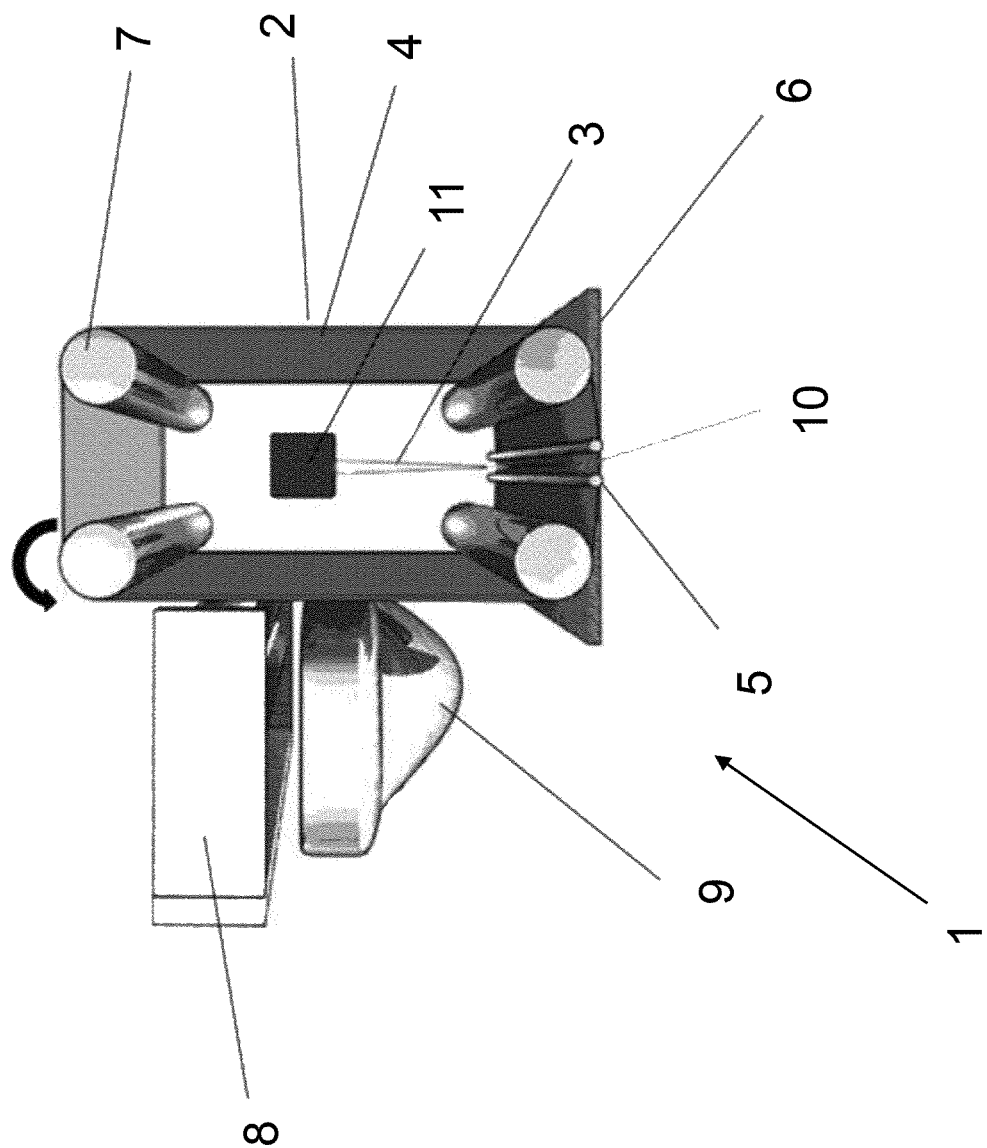

LASER PRINTING PROCESS

The invention relates to a printing process and to the use of an ink.

A process for printing a substrate in which drops of ink are thrown from an ink-coated carrier onto a substrate to be printed is known from, for example, U.S. Pat. No. 6,241,344 B1. To transfer the ink, energy is introduced through the carrier into the ink on the carrier at the position at which the substrate is to be printed. This causes vaporization of a part of the ink, and so the ink parts from the carrier. As a result of the pressure of the vaporizing ink, the drop of ink thus parted is thrown onto the substrate.

By introducing the energy in a directed way it is possible hereby to transfer the ink onto the substrate in accordance with a pattern to be printed. The energy needed to transfer the ink is introduced, for example, by a laser. The carrier bearing the applied ink is, for example, a circulating ribbon, to which ink is applied by means of an application device before the printing region. The laser is located in the interior of the circulating ribbon, and so the laser acts on the carrier on the side facing away from the ink. Application of the ink to the ink carrier is accomplished, for example, by a roll which is immersed in an ink reservoir.

A printing machine of this kind is also known from, for example, U.S. Pat. No. 5,021,808 A. In accordance with the teaching of this document as well, ink is applied from a reservoir container, using an application device, to a circulating ribbon, there being situated within the circulating ribbon a laser by means of which the ink is vaporized at mandated positions and is thrown accordingly onto the substrate to be printed. The ribbon in this case is made of a material transparent to the laser. For targeted vaporization of the ink it is possible for the circulating ribbon to be coated with an absorption layer, in which the laser light is absorbed and is converted into heat, and so the ink is vaporized at the position of exposure to the laser.

Furthermore, it is known through laid-open specification DE 102 10 146 A1 that by using small, laser-absorbing particles it is possible to boost the efficiency of the laser-induced printing process. This is important in that it allows a significant increase in the productivity of the process described.

One disadvantage when using absorption particles is that these particles very often also absorb in the visible wavelength spectrum, resulting in a more or less strong discoloration of the ink (liquid ink) that is to be printed.

A further disadvantage is that the laser-induced ejection of the particles may be accompanied by emission of numerous disruptive satellites which deteriorates the quality of the printing result.

The object of the invention, by comparison, is at least to reduce the stated disadvantages of the prior art. Generally the aim is to achieve a good printing result.

The object of the invention is already achieved by a printing process according to claim 1.

Preferred embodiments and developments of the invention are apparent from the subject matter of the dependent claims and also the description.

The invention relates to a printing process in which a substrate to be printed is disposed opposite an ink carrier having an ink layer, the ink layer being irradiated regionally by a laser beam, characterized in that the ink layer comprises reflective particles and a soluble polymer having a weight average (Mw) molecular weight of greater than 250 000 g/mol, where the weight average (Mw) of the molecular weight of the soluble polymer is determined according to DIN 55672-2: 2016-3. In this way, in particular, droplets of ink are extracted from the ink layer and transferred onto the substrate.

The ink layer can be formed by coating an ink ribbon with an ink that comprises reflective particles, a soluble polymer, dyes and/or pigments, and a solvent. The soluble polymer is a polymer that is solvable in the solvent that is used as solvent for the ink composition.

In accordance with the invention, the ink used for the process of the invention is admixed with reflective particles for the purpose of laser absorption on the part of the ink layer.

The reflective particles might have also adsorbing properties in respect to the laser beam, especially in the wavelength range of the laser used, more particularly in the range of 300 to 3000 nm. However, in contrast to absorption particles like carbon black particles, reflective particles have also reflective properties concerning the visible wavelength spectrum.

Particles which have a high reflection relative to the wavelength of the laser used, more particularly 300 to 3000 nm, might be used.

In contrast to absorption particles known from the prior art, such as carbon black, for example, the reflective particles may be substantially neutral for the coloured impression conveyed by the ink layer.

Particles which can be used are, first, for example, particles of metal or of a metal-coated carrier material. These particles produce reflection on the basis of mirroring surfaces. In particular it is possible to use what are called effect pigments, preferably lustre pigments.

The reflective particles may be added in particular in an amount of more than 1 and/or less than 10 weight % to the ink that is used for the ink layer.

Further, transparent particles can be used which develop a mirroring effect by virtue of total reflections. Particles having an optical interference coating can also be used.

According to one embodiment of the invention, particles having a mean particle size of 0.1 to 10 μm, preferably of 1 to 5 μm, are used.

The particle size may be determined by laser diffraction measurement. This can be done using as a measuring instrument, for example, the Shimadzu® SALD-2201 laser size analyser.

In this way, particularly effective absorption can be achieved.

In order to achieve a high reflection effect, particles may be used which have an L* value in the L*a*b* colour space of more than 50, preferably more than 70 and more preferably more than 80.

Further, the particles may be neutral in colour. In one embodiment the particles in the L*a*b* colour space have an a* and/or b* value of +/−30. Use may be made more particularly of particles having an a* and/or b* value in the L*a*b* colour space of less than +/−5, preferably +/−3.

The values in L*a*b* colour space may be determined, for example, using a DTM 1045® spectrophotometer.

The invention further relates to a printing process in which a substrate to be printed is disposed opposite an ink carrier having an ink layer, the ink layer being irradiated regionally by a laser beam, and said layer accelerating by absorption of the laser beam in the substrate direction, wherein laser absorption is generated by particles.

According to the invention, a soluble polymer having a molecular weight Mw of greater than 250 000 g/mol is added as additive to a solvent of the ink used for the ink layer.

Said weight average (Mw) of the molecular weight is determined according to DIN 55672-2: 2016-3: N,N-dimethylacetamid is used as elution solvent.

Additional practical measuring detail: especially use of PSS-SDV-gel (macroporous styrene-divinylbenzene copolymer network) columns. (More) Especially use of the combination of four PSS-SDV-gel (macroporous styrene-divinylbenzene copolymer network) columns; dimensions: 300 mm*8 mm ID per column; particle size: 5 or 10 μm; pore size: $1*10^5$ Å; $1*10^4$ Å; $1*10^3$ Å; $1*500$ Å.

The ink comprises in particular a solvent, a dye, more particularly a pigment, and also particles which boost absorption of the laser light, more particularly the reflective particles described above.

It has emerged that by adding a polymer which is soluble in the solvent, it is possible to reduce significantly the risk of formation of satellites (splashes).

Without being tied to the theory, this is probably attributable to factors including a greater elasticity on the part of the ink thus modified.

The proportion of the soluble polymer is according to one embodiment of the invention 0.05-2 weight %, of the total ink mixture. The proportion of the soluble polymer is preferably more than 0.05 and/or less than 1 weight %, typically more than 0.1 and/or less than 0.8 weight %, of the total ink mixture.

The soluble polymer used according to one preferred embodiment of the invention comprises a cellulose ester, a cellulose nitrate, a cellulose ether, more particularly a hydroxypropylcellulose, a polyurethane or a vinyl polymer. Hydroxypropylcellulose in particular, in other words a cellulose ether in which some of the hydroxyl groups are linked as ethers with hydroxypropyl groups, appears particularly suitable for the effect of the invention.

The invention further relates to the use of an ink having reflective particles and a soluble polymer having a molecular weight of greater than 250 000 g/mol for a printing process as described above.

BRIEF DESCRIPTION OF THE DRAWINGS

The subject matter of the invention is to be elucidated in more detail below, referring to the drawing of FIG. 1.

FIG. 1 is a schematic view of a printing machine used for the process of the invention.

DETAILED DESCRIPTION OF THE DRAWING

FIG. 1 is a schematic view of one exemplary embodiment of a printing machine (1) of the invention.

The printing machine (1) comprises as ink carrier (4) a circulating ink ribbon.

The ink ribbon is coated homogeneously and over its full area with ink (2) by the inking unit (8). The ink ribbon subsequently moves in the arrow direction to the printing nip (10). The ink carrier (4) is distanced by a gap from the substrate (6) to be printed. Preferably the width of the gap is adjustable and/or is regulated continuously. This can be done by means, for example, of adaptable distancing rolls (5).

In the printing nip (10), using a laser scanner (11), a laser beam (3) is focused through the ink carrier (4), which is permeable to the laser light, into the ink (2). The local and targeted heating of parts of the ink (2) by means of the laser beam (3) causes explosive vaporization of a small region of the ink (2), and so a part of the printing ink (2) is transferred from the ink ribbon onto the opposite substrate (6).

The ink ribbon, controlled by the distancing rolls (5) and the deflection rollers (7), subsequently moves back in the direction of the inking unit (8). On contact between inking unit (8) and the ink ribbon, the ink (2) consumed is replenished.

The excess ink (2) in the inking unit (8) is collected in the ink trough (9) at the bottom and is added continuously in repetition to the printing operation.

It is possible to use reflective materials composed of metal and metal-coated polymeric particles.

A further aspect for improving print quality involves modifying the rheology of the ink to be printed in such a way that disruptive splashes do not form at all or only to a greatly reduced extent. It has been found that the low-level admixing of soluble polymers in the average molecular weight range from about Mw: 250 000 g/mol to about 1 500 000 g/mol has a positive influence on the print behaviour of the ink.

These admixtures modify what is called the elasticity of the ink. Admixtures of soluble polymers around the lower Mw range (Mw: 10 000 g/mol to approximately 100 000 g/mol) have only a thickening effect and only slight anti-splash properties. Polymers with higher Mw values (>1 500 000 g/mol) lead in contrast to no further improvement in the anti-splash properties, but merely further hinder the solubility.

Preference is therefore given to using a polymer having a molecular weight (Mw) below 2 500 000 g/mol, more preferably below 1 500 000 g/mol.

The following listing shows examples of suitable soluble polymer admixtures with various solvents customary within the printing industry, and the amounts typically used in the total ink mixture (in weight %):

| Solvent | Cellulose ester | Cellulose nitrate | Cellulose ether | Polyurethane | Vinyl polymer |
| --- | --- | --- | --- | --- | --- |
| Glycol ether | | | | | |
| Ethoxypropanol | 0.1-0.2% | 0.1-0.2% | 0.1-0.2% | 0.05-0.15% | 0.2-0.3% |
| Methoxypropanol | 0.1-0.2% | 0.1-0.2% | 0.1-0.2% | 0.05-0.15% | 0.2-0.3% |
| Alcohol | | | | | |
| Ethanol | 0.2-0.5% | 0.2-0.5% | 0.2-0.5% | 0.1-0.3% | 0.15-0.35% |
| Propanol | 0.2-0.5% | 0.2-0.5% | 0.2-0.5% | 0.1-0.3% | 0.15-0.35% |
| Ester | | | | | |
| Ethyl acetate | 0.2-0.8% | 0.2-0.8% | 0.2-0.8% | 0.2-0.8% | 0.2-0.8% |
| Butyl acetate | 0.2-0.8% | 0.2-0.8% | 0.2-0.8% | 0.2-0.8% | 0.2-0.8% |
| arom. hydrocarbon | | | | | |

-continued

| Solvent | Cellulose ester | Cellulose nitrate | Cellulose ether | Polyurethane | Vinyl polymer |
|---|---|---|---|---|---|
| Toluene | 0.1-0.4% | 0.1-0.4% | 0.1-0.4% | | |
| Xylene | 0.1-0.4% | 0.1-0.4% | 0.1-0.4% | | |
| Dialkyl ether Di-n-butyl ether | 0.25-0.5% | 0.25-0.5% | 0.25-0.5% | 0.25-0.5% | 0.25-0.5% |
| Glycol ester 2-Methoxyethyl acetate | 0.1-0.4% | 0.1-0.4% | 0.1-0.4% | 0.1-0.4% | 0.1-0.4% |
| Glycol ether Butyl glycol | 0.2-0.6% | 0.2-0.6% | 0.2-0.6% | 0.2-0.6% | 0.2-0.6% |

By means of the invention it has been possible to reduce the risk of formation of satellites which improves the quality of the printing result. The influence of the molecular weight of the used soluble polymer is additionally shown below by the anti-spray effect of polymer solutions in the above-mentioned printing process:

Various ink mixtures were printed according to the above-mentioned process. Here it could be observed that in pure printing without additives the printed dot shows a high number of scattered splashes.

This number of splashes could be significantly reduced by adding a small amount of high molecular soluble additives to the ink.

In this connection the additives from the chemical substance groups "cellulose ester", "cellulose nitrate", "cellulose ether", "polyurethane" and also "vinyl polymers" with the suitable molecular weights of >250,000 Mw with a total proportion between 0.05 and 2% have proved to be excellent anti-spray additives.

The following tabular evaluation (total proportion in weight %; 3-Ethoxy-1-propanol is used as solvent, use of reflective aluminum particles, the scattered splashes were counted under microscope) provides corresponding experimental examples:

| Cellulose ether Mw | total proportion | scattered splashes % |
|---|---|---|
| No polymer | | 100% (comparative example) |
| 100.000 | 1% | ca. 90% (comparative example) |
| 300.000 | 1% | ca. 70% |
| 800.000 | 1% | ca. 10% |
| 1.200.000 | 1% | ca. 10% |

LIST OF REFERENCE NUMERALS RELATING TO FIG. 1

1. Printing machine
2. Ink
3. Laser beam
4. Ink carrier
5. Distancing roll
6. Substrate
7. Deflection roller
8. Inking unit
9. Ink trough
10. Printing nip
11. Laser scanner

The invention claimed is:

1. A printing process comprising:
disposing a substrate to be printed opposite an ink carrier including an ink layer,
regionally irradiating the ink layer with a laser beam, the ink layer being accelerated in a direction of the substrate by absorption of the laser beam wherein the ink layer comprises an ink, the ink comprises admixed reflective particles for laser absorption, a solvent, and an additive including a soluble polymer having a weight average (Mw) molecular weight of greater than 250 000 g/mol, the weight average molecular weight being determined according to DIN 55672-2: 2016-3, said soluble polymer comprising one or more of a cellulose ester, a cellulose nitrate, and a polyurethane.

2. The printing process according to claim 1, wherein the weight average molecular weight of the soluble polymer ranges from 250 000 g/mol to 2 500 000 g/mol.

3. The printing process according to claim 1, wherein the weight average molecular weight of the soluble polymer ranges from 250 000 g/mol to 1 500 000 g/mol.

4. The printing process according to claim 1, wherein the ink includes the soluble polymer in an amount between 0.05 to 2 weight %, of the total weight of the ink.

5. The printing process according to claim 1, wherein the ink includes the soluble polymer in an amount between 0.05 to 1 weight %, of the total weight of the ink.

6. The printing process according to claim 1, wherein the ink includes the soluble polymer in an amount between 0.1 and 0.8 weight %, of the total weight of the ink.

7. The printing process according to claim 1, wherein the soluble polymer comprises the cellulose ester.

8. The printing process according to claim 1, wherein the reflective particles include one or more of metal and a metal-coated carrier material.

9. The printing process according to claim 1, wherein the reflective particles have a mean particle size of 0.1 to 10 μm.

10. The printing process according to claim 1, wherein the reflective particles:
have an L* value in the L*a*b* colour space of more than 50,
have an a* and/or b* value in the L*a*b* colour space of between −5 and 5.

11. The printing process according to claim 1, wherein the soluble polymer comprises the cellulose nitrate.

12. The printing process according to claim 1, wherein the soluble polymer further comprises a cellulose ether.

13. The printing process according to claim 1, wherein the soluble polymer further comprises a hydroxypropylcellulose.

14. The printing process according to claim 1, wherein the soluble polymer comprises the polyurethane.

15. The printing process according to claim 1, wherein the soluble polymer further comprises a vinyl polymer.

16. A printing process comprising:
disposing a substrate to be printed opposite an ink carrier including an ink layer,
regionally irradiating the ink layer with a laser beam, the ink layer being accelerated in a direction of the substrate by absorption of the laser beam wherein the ink layer comprises an ink, the ink comprises admixed reflective particles for laser absorption, a solvent, and an additive including a soluble polymer having a weight average (Mw) molecular weight of greater than 250 000 g/mol, the weight average molecular weight being determined according to DIN 55672-2: 2016-3,
said reflective particles comprising a metal-coated carrier.

17. The printing process according to claim 16, wherein the weight average molecular weight of the soluble polymer ranges from 250 000 g/mol to 1 500 000 g/mol.

18. The printing process according to claim 16, wherein the reflective particles:
have an L* value in the L*a*b* colour space of more than 50,
have an a* and/or b* value in the L*a*b* colour space of between −5 and 5.

19. The printing process according to claim 16, wherein the soluble polymer comprises a polyurethane.

* * * * *